United States Patent [19]

Greene et al.

[11] E Re. 30,266

[45] Reissued May 6, 1980

[54] ANIMAL DRYER

[76] Inventors: Edwin R. Greene; Rodney F. Greene, both of 1634 Michael Dr., Pinole, Calif. 94564

[21] Appl. No.: 904,940

[22] Filed: May 11, 1978

Related U.S. Patent Documents

Reissue of:

[64] Patent No.: 4,044,474
Issued: Aug. 30, 1977
Appl. No.: 712,057
Filed: Aug. 6, 1976

[51] Int. Cl.[2] ..... F26B 19/00

[52] U.S. Cl. ..... 34/86; 34/96; 55/470; 174/16 R

[58] Field of Search ..... 34/35, 86, 96–98, 34/202; 165/99, 101; 98/116, 36; 174/16 R; 55/470, 385 A

[56] References Cited

U.S. PATENT DOCUMENTS

| | | | |
|---|---|---|---|
| 1,991,222 | 2/1935 | Laib | 34/230 |
| 2,251,649 | 8/1941 | Wichmann | 55/470 |
| 2,825,500 | 3/1958 | McLean | 55/470 |
| 3,080,695 | 3/1963 | Hay | 55/470 |
| 3,086,441 | 4/1963 | London | 98/36 |
| 3,175,534 | 3/1965 | Polland | 34/202 |
| 3,229,609 | 1/1966 | Larson et al. | 98/36 |
| 3,255,686 | 6/1966 | Larson et al. | 98/36 |
| 3,327,935 | 6/1967 | Berlant | 98/36 |
| 3,396,652 | 8/1968 | Morrison et al. | 98/116 |
| 3,426,445 | 2/1969 | Steffen | 34/233 |
| 3,572,234 | 3/1971 | Schoenthaler | 98/36 |
| 3,968,660 | 7/1976 | Amann et al. | 165/108 |

FOREIGN PATENT DOCUMENTS

| | | | |
|---|---|---|---|
| 857564 | 12/1960 | United Kingdom | 34/97 |
| 967097 | 8/1964 | United Kingdom | 98/36 |

*Primary Examiner*—Henry C. Yuen
*Attorney, Agent, or Firm*—Bielen and Peterson

[57] ABSTRACT

A blower system to dry dogs or other animals, and designed to give a more forceful volume of air making it possible to separate and fluff the hair. One, two or three motors are available to draw air through a filter system, heat the air, and eject the air outward through hoses attached to a cage or a hand held dryer.

9 Claims, 7 Drawing Figures

ANIMAL DRYER

Matter enclosed in heavy brackets [ ] appears in the original patent but forms no part of this reissue specification; matter printed in italics indicates the additions made by reissue.

BACKGROUND OF THE INVENTION

In the past there has been a real need for a useful, all-purpose dryer that is used to dry and fluff animals, in a relatively short length of time. Animal hair, or coat, is generally very thick and there is a lot of it, so most of the time it is a tedious, long drawn out process to keep the animal passive until its coat can be thoroughly dried. A high volume, fast moving source of warm air is most important.

FIELD OF THE INVENTION

The present invention relates to an animal dryer.

SUMMARY OF THE INVENTION

The present invention of an animal dryer includes three electric motors which may be used separately, or together, to pull air through a container with a filter system therein. The motors heat the air and eject it through any of a plurality of outlets that may be connected to an animal cage or to a hand held dryer. The volume and velocity of the ejected air is determined by the number of motors operating.

The primary object of the invention is to provide a variable volume, warm air dryer as would be used to dry animals.

Other objects and advantages will become apparent in the following specification when considered in light of the attached drawings.

DESCRIPTION OF THE PREFERRED EMBODIMENT

Figure 1:
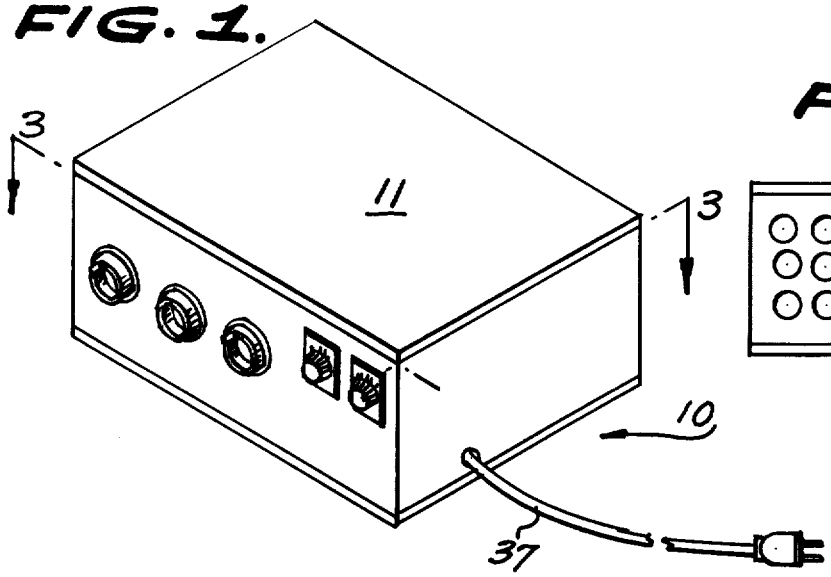
FIG. 1 is a perspective view of the cabinet making up the invention.
Figure 2:
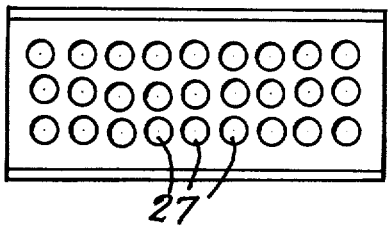
FIG. 2 is a front elevation view of the air intake end of the invention.
Figure 3:
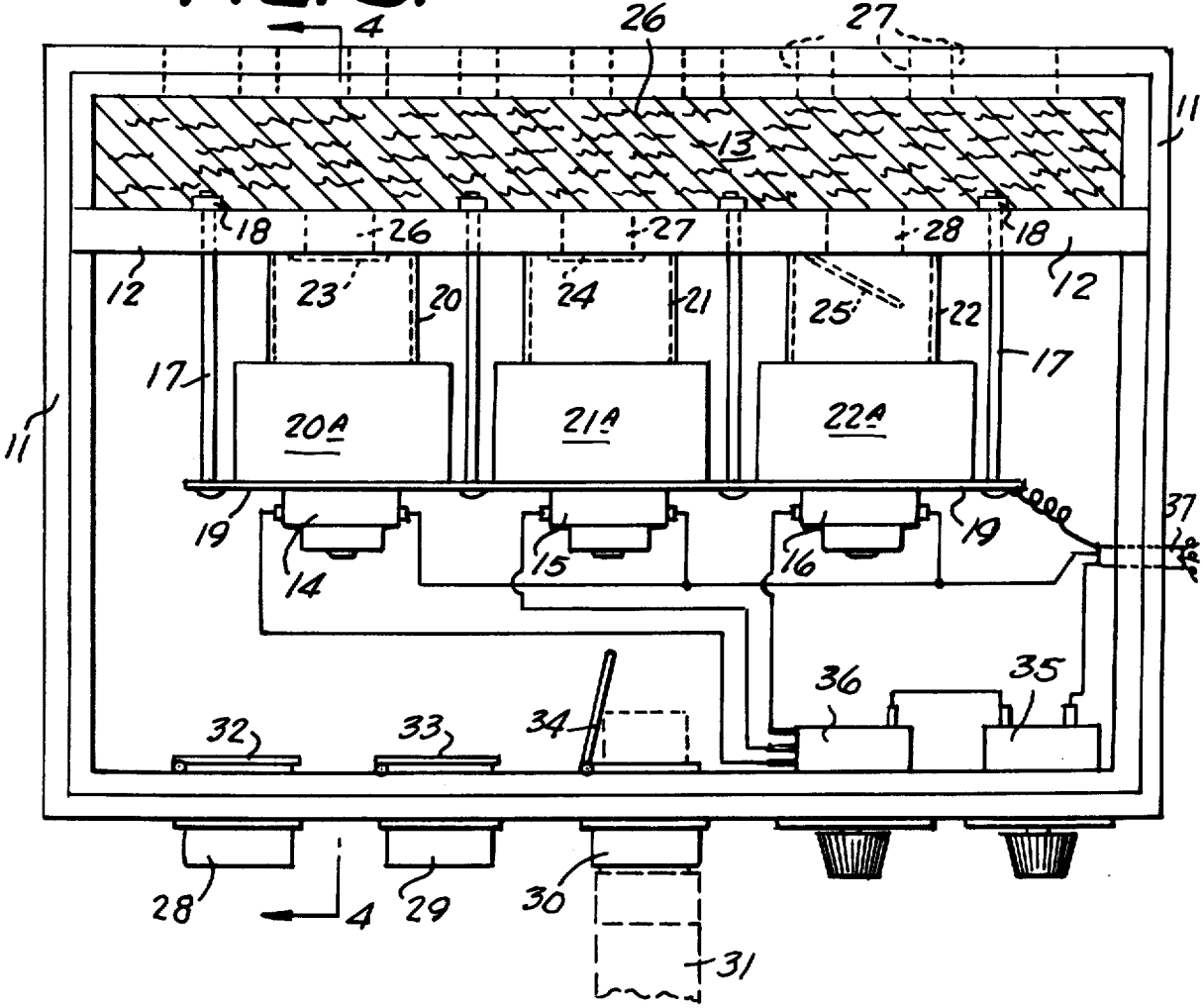
FIG. 3 is a view taken along the line 3—3 of FIG. 1, looking in the direction of the arrows.

Referring now to the drawings in detail, wherein like reference characters indicate like parts throughout the several figures, the reference numeral 10 indicates generally an animal dryer 10 which is incorporated in a cabinet 11.

Cabinet 11 is made of relatively sturdy wood, or other material, and its sides and top, when in place, comprise an essentially air tight compartment.

Extending across the width of cabinet 11, and fastened to its side walls there is a partition 12, the partition 12 being inserted into side walls 11 to form an air-tight compartment 13 in the rear of the cabinet.

There are three electric motors 14, 15, and 16 positioned forward of partition 12, and bolted to the partition by means of elongated bolts 17 and their associated nuts 18. For additional stability bolts 17 pass through mounting bars 19 that extend along the forward face of all the motors to lock them in place.

Forming part of the motor mountings there are tubular collars 20, 21, 22 which extend from motors 14, 15, 16 and fit snugly against partition 12. Within the ends of collars 20, 21, 22 there are spring mounted flutter valves 23, 24, and 25 that serve to open or close holes 26, 27, and 28 cut through partition 12.

Figure 4:
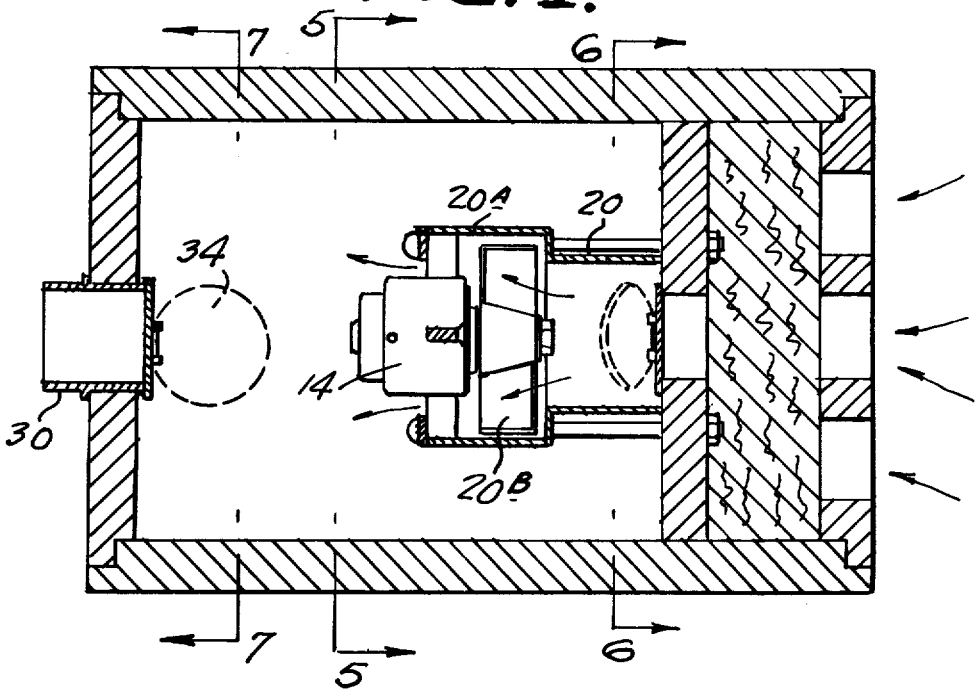
FIG. 4 is a view taken along the line 4—4 of FIG. 3, looking in the direction of the arrows.
Figure 5:
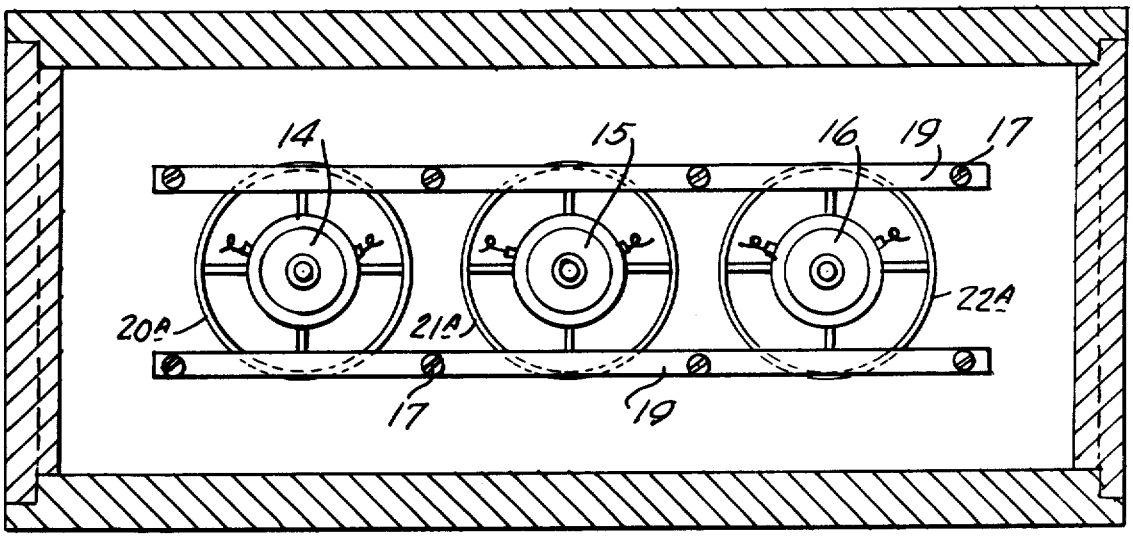
FIG. 5 is a view taken along the line 5—5 of FIG. 4, looking in the direction of the arrows.
Figure 6:
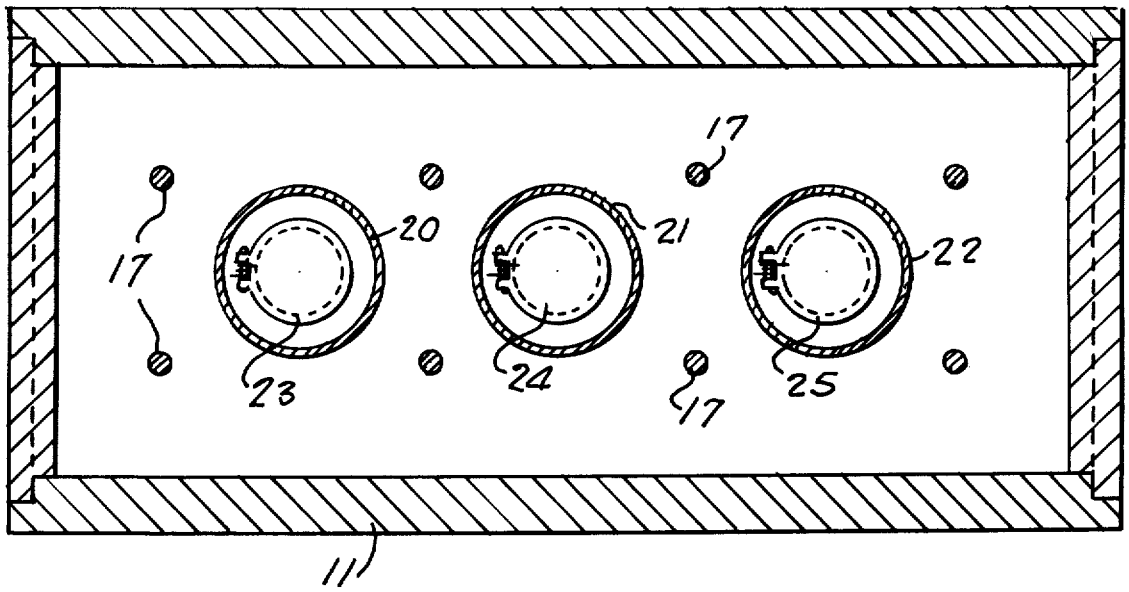
FIG. 6 is a view taken along the line 6—6 of FIG. 4, looking in the direction of the arrows.
Figure 7:
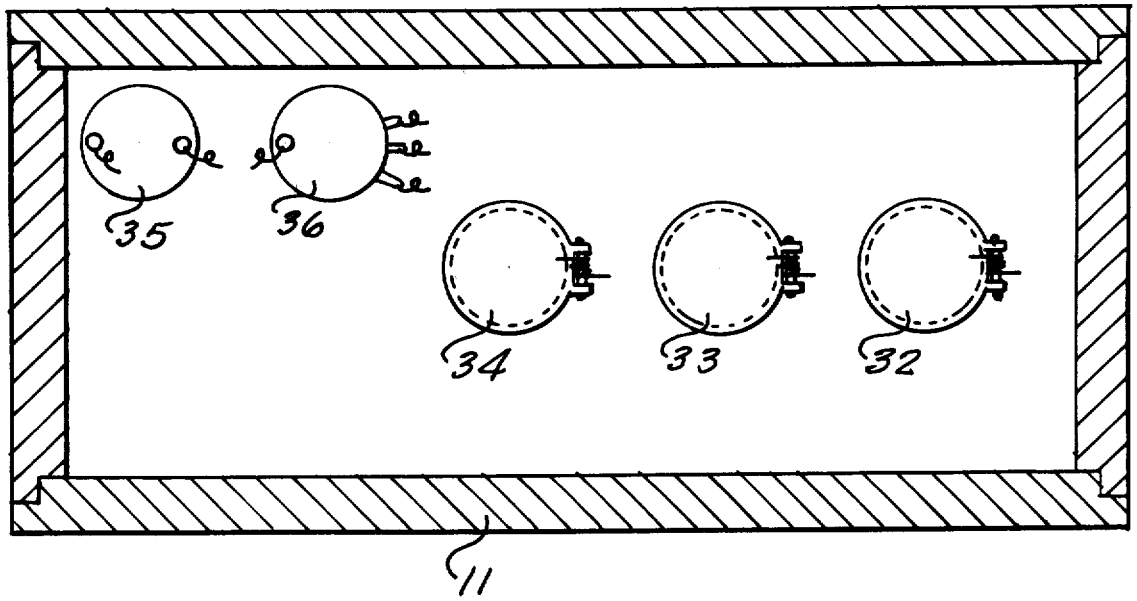
FIG. 7 is a view taken along the line 7—7 of FIG. 4, looking in the direction of the arrows.

The inner ends of collars 20, 21, and 22 are widened out to comprise fan housings 20A, 21A, and 22A, these housings being larger in diameter than motors 20, 21, and 22, which they partially encompass, thereby providing an air passage between the fan housings and the motor bodies (See FIG. 4 for a clear view).

Journalled to the rotating shafts of motors 20, 21, and 22 there are fans 20B, 21B, and 22B, these fans being the active force by which air is moved through the invention.

From the drawings it is thus clear an air passage is formed by collars 20, 21, and 22, the flutter valves 23, 24, and 25, along with the motors and fans themselves.

The air-tight compartment 13, between partition 12 and the back wall of cabinet 11, is built to serve as a filter system, and is filled with fibrous material 26 which strains out dust particles and other foreign substances present in the air. The back wall of cabinet 11 has a plurality of circular holes 27 drilled through it to serve as an air imput for filtering and later warming.

The front panel of cabinet 11 has a plurality of outlet fittings 28, 29, and 30 for the passage of warm air to a utilizing hose 31. On the inner side of these fittings there are spring urged flutter valves 32, 33, and 34 which pivot inward (as shown by 34) when a hose is inserted therein.

Also on the front panel there are a pair of rheostats 35 and 36, electrically connected to the motors, for determining which of the motors is running and also the speed at which the fans are revolving. An electric cable 37 supplies potential to the rheostats and therefore to the motors.

In the use and operation of the invention, cable 37 is plugged into an electric outlet to start the device, and a hose 31 is inserted into fitting 30 for withdrawing warmed air. Then, either rheostat 35 or 36, or both, are turned to start motors 14, 15, or 16 depending on the volume of air required.

If motor 16 is the only one started, for example, then air is drawn in through holes 27 in the back of cabinet 11, and it passes through filter material 26 in filtering compartment 13. Through the influence of fan 22B, rotating in fan housing 22A, air is pulled along tubular collar 22 and causes spring mounted flutter valve 25 to open, thereby opening passage 28 so that air moves through.

When this is done air moves through fan 22B and is blown through the spacing between fan cover 22A and motor 16 itself, to be blown into the forward end of the cabinet. As stated previously, hose 31 has been inserted into fitting 30, and the inner end of the hose props open flutter valve 34 so that air moved by the fan now passes out the hose, to be utilized as desired.

It should be noted that the air passing through the fan, etc., blows directly over the motor casing itself, and it is this warm motor casing that is the heating means for the air.

Also note that rheostats 35 and 36 are connected to all three motors 14, 15, and 16 and it is by adjustment of these rheostats that either one, two, or all three of the motors are run simultaneously, and their speeds varied, depending upon the volume and temperature of the output air desired. With three output fittings, 28, 29, and 30, one, two, or three hoses may be connected to facilitate use of the air output demanded.

Having thus described the preferred embodiment of the invention it should be understood that numerous structural modifications and adaptations may be resorted to without departing from the spirit of the invention.

What is claimed is:

1. A hair dryer comprising a filter system, means for admitting surrounding air to the filter system, a partition having a plurality of openings for directing the air to leave the filter system, a plurality of valves in said openings for selectively permitting the air to leave said openings, a plurality of motors each having an air inlet connected to one of said openings, fans driven by the motors to blow the air past the motors and to thereby warm the air from the heat of the motors, means for collecting the warm air from the motors, and means for attachment to the collecting means for conducting warm air to a user.

2. The device of claim 1 wherein the means for admitting air comprises a plurality of holes drilled in the outer wall of the filter system.

3. The device of claim 2 further including controls for determining the number of motors operating simultaneously to thereby vary the volume of warm air being desired.

4. The device of claim 3 wherein the means for attachment to the collecting means comprises a plurality of fittings for holding flexible hoses.

5. The device of claim 4 wherein the filter system includes a compartment of fibrous material.

6. The device of claim 5 wherein the valves for permitting the air to leave the filter include circular, spring mounted disks.

7. The device of claim 6 further including spring mounted disks within the fittings for holding flexible hoses, said disks being pushed open when the hoses are inserted in the fittings.

*8. A hair dryer comprising a substantially airtight compartment, means for admitting surrounding air to said compartment, a partition having a plurality of openings for directing the air to said compartment, a plurality of valves in said openings for selectively permitting the air to leave said openings, a plurality of motors each having an air inlet connected to one of said openings, fans driven by the motors to blow the air past the motors and to thereby warm the air from the heat of the motors, means for collecting the warm air from the motors, and means for attachment to the collecting means for conducting warm air to a user.*

*9. The hair dryer of claim 8 which additionally comprises filter means for filtering the air entering said compartment.*

* * * * *